(12) United States Patent
McMillan

(10) Patent No.: US 7,106,020 B1
(45) Date of Patent: Sep. 12, 2006

(54) METHOD OF OPERATING A BRUSHLESS DC MOTOR

(75) Inventor: Scott D. McMillan, Golden Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/162,138

(22) Filed: Aug. 30, 2005

(51) Int. Cl.
*H01R 39/46* (2006.01)

(52) U.S. Cl. .............. 318/439; 318/139; 318/618; 318/610; 318/616

(58) Field of Classification Search .............. 318/439, 318/618, 610, 616, 49, 560, 139
See application file for complete search history.

(56) References Cited

U.S. PATENT DOCUMENTS

| | | |
|---|---|---|
| 3,937,974 A | 2/1976 | Lafuze |
| 3,959,702 A | 5/1976 | Godwin et al. |
| 4,027,216 A | 5/1977 | Rozek |
| 4,038,589 A | 7/1977 | Heyne et al. |
| 4,139,807 A | 2/1979 | Hucker |
| 4,295,085 A | 10/1981 | Lafuze |
| 4,311,950 A | 1/1982 | Goldin et al. |
| 4,315,202 A | 2/1982 | Dawson et al. |
| 4,364,004 A | 12/1982 | Bourbeau |
| 4,393,597 A | 7/1983 | Picard et al. |
| 4,422,028 A | 12/1983 | Godwin et al. |
| 4,501,155 A | 2/1985 | Garritano |
| 4,546,293 A | 10/1985 | Peterson et al. |
| 4,591,774 A | 5/1986 | Ferris et al. |
| 4,591,775 A | 5/1986 | Niissel et al. |
| 4,608,527 A | 8/1986 | Glennon et al. |
| 4,618,808 A | 10/1986 | Ish-Shalom et al. |
| 4,651,068 A | 3/1987 | Meshkat-Razavi |
| 4,656,410 A | 4/1987 | Shibata |
| 4,659,973 A | 4/1987 | Stich |
| 4,701,839 A | 10/1987 | McNally et al. |
| 4,704,569 A | 11/1987 | Mallick, Jr. et al. |
| 4,751,438 A | 6/1988 | Markunas |
| 4,818,908 A | 4/1989 | Tamae et al. |
| 4,825,138 A | 4/1989 | Platzer et al. |
| 4,835,448 A | 5/1989 | Dishner et al. |
| 4,839,579 A | 6/1989 | Ito et al. |
| 4,841,202 A | 6/1989 | Dishner et al. |
| 4,888,533 A | 12/1989 | Gotoh et al. |
| 4,897,583 A | 1/1990 | Rees |
| 4,937,508 A | 6/1990 | Rozman |
| 4,939,441 A | 7/1990 | Dhyanchand |
| 4,949,021 A | 8/1990 | Rozman et al. |
| 5,029,263 A | 7/1991 | Rozman |

(Continued)

OTHER PUBLICATIONS

"Current Loop Control of a Brushless DC Motor with Hall Sensors Using the ADMC401," Analog Devices Inc., 19 pages, Oct. 2001.

(Continued)

*Primary Examiner*—Karen Masih
(74) *Attorney, Agent, or Firm*—Gregory M. Ansems

(57) ABSTRACT

Methods and devices for brushless DC motor operation. An example method may include using previously sensed Hall effect sensor transitions to predict a future Hall effect transition, and dividing a time between a most recent Hall effect sensor transition and the predicted Hall effect sensor transition into time increments. The time increments may be used to effect phase advance by selecting a number of time increments to create a time offset for phase advance purposes. The time increments may also be used as a virtual encoder. Devices incorporating controllers and control circuitry for performing like methods are also discussed.

20 Claims, 5 Drawing Sheets

U.S. PATENT DOCUMENTS

| | | | |
|---|---|---|---|
| 5,038,062 A | 8/1991 | Shiraki |
| 5,047,681 A | 9/1991 | Gaillard et al. |
| 5,053,688 A | 10/1991 | Rees |
| 5,053,689 A | 10/1991 | Woodson et al. |
| 5,097,189 A | 3/1992 | Ito et al. |
| 5,113,125 A | 5/1992 | Stacey |
| 5,168,202 A | 12/1992 | Bradshaw et al. |
| 5,200,661 A | 4/1993 | Shramo et al. |
| 5,202,610 A | 4/1993 | Frye et al. |
| 5,274,315 A | 12/1993 | Finocchi |
| 5,384,527 A | 1/1995 | Rozman et al. |
| 5,391,970 A * | 2/1995 | Chaffee et al. ............. 318/618 |
| 5,406,186 A | 4/1995 | Fair |
| 5,416,397 A | 5/1995 | Mazzara et al. |
| 5,416,652 A | 5/1995 | Lewis |
| 5,420,492 A | 5/1995 | Sood et al. |
| 5,425,165 A | 6/1995 | Shramo et al. |
| 5,428,470 A | 6/1995 | Labriola, II |
| 5,430,362 A | 7/1995 | Carr et al. |
| 5,449,986 A | 9/1995 | Dozor |
| 5,450,999 A | 9/1995 | Scholten et al. |
| 5,461,293 A | 10/1995 | Rozman et al. |
| 5,488,286 A | 1/1996 | Rozman et al. |
| 5,493,200 A | 2/1996 | Rozman et al. |
| 5,495,162 A | 2/1996 | Rozman et al. |
| 5,495,163 A | 2/1996 | Rozman et al. |
| 5,519,546 A | 5/1996 | Lewis |
| 5,565,750 A | 10/1996 | Padgett |
| 5,567,874 A | 10/1996 | Suzuki et al. |
| 5,587,641 A | 12/1996 | Rozman |
| 5,594,322 A | 1/1997 | Rozman et al. |
| 5,619,085 A | 4/1997 | Shramo |
| 5,656,911 A | 8/1997 | Nakayama et al. |
| 5,677,605 A | 10/1997 | Cambier et al. |
| 5,710,755 A | 1/1998 | Chen |
| 5,740,880 A | 4/1998 | Miller |
| 5,760,707 A | 6/1998 | Katagiri |
| 5,767,643 A | 6/1998 | Pham et al. |
| 5,777,477 A | 7/1998 | Wynn |
| 5,793,180 A | 8/1998 | Maiocchi et al. |
| 5,796,194 A | 8/1998 | Archer et al. |
| 5,798,596 A | 8/1998 | Lordo |
| 5,850,130 A | 12/1998 | Fujisaki et al. |
| 5,859,518 A | 1/1999 | Vitunic |
| 5,874,796 A | 2/1999 | Petersen |
| 5,912,542 A | 6/1999 | Zalesski |
| 5,912,543 A | 6/1999 | Mahr et al. |
| 5,923,728 A | 7/1999 | Ikkai et al. |
| 5,964,455 A | 10/1999 | Catanzarite et al. |
| 5,986,419 A | 11/1999 | Archer et al. |
| 5,990,643 A | 11/1999 | Holling et al. |
| 5,995,710 A | 11/1999 | Holling et al. |
| 6,002,234 A | 12/1999 | Ohm et al. |
| 6,049,194 A | 4/2000 | Nakagawa et al. |
| 6,075,332 A | 6/2000 | McCann |
| 6,078,158 A | 6/2000 | Heeren et al. |
| 6,114,827 A | 9/2000 | Alvaro |
| 6,181,091 B1 | 1/2001 | Heeren et al. |
| 6,222,333 B1 | 1/2001 | Heeren et al. |
| 6,236,179 B1 | 5/2001 | Lawler et al. |
| 6,246,232 B1 | 6/2001 | Okumura |
| 6,271,641 B1 | 8/2001 | Yasohara et al. |
| 6,307,336 B1 | 10/2001 | Goff et al. |
| 6,310,450 B1 | 10/2001 | Arrigo |
| 6,313,601 B1 | 11/2001 | Kubo et al. |
| 6,324,085 B1 | 11/2001 | Kimura et al. |
| 6,367,337 B1 | 4/2002 | Schlabach |
| 6,373,211 B1 | 4/2002 | Henry et al. |
| 6,407,524 B1 | 6/2002 | Endo et al. |
| 6,508,072 B1 | 1/2003 | Kanazawa et al. |
| 6,524,209 B1 | 2/2003 | Ito et al. |
| 6,549,871 B1 | 4/2003 | Mir et al. |
| 6,577,097 B1 | 6/2003 | Krefta et al. |
| 6,580,235 B1 | 6/2003 | Laurent |
| 6,605,912 B1 | 8/2003 | Bharadwaj et al. |
| 6,626,002 B1 | 9/2003 | Notohara et al. |
| 6,631,781 B1 | 10/2003 | Williams et al. |
| 6,647,329 B1 | 11/2003 | Kleinau et al. |
| 6,683,427 B1 | 1/2004 | Desbiolles et al. |
| 6,686,713 B1 | 2/2004 | Desbiolles et al. |
| 6,694,287 B1 | 2/2004 | Mir et al. |
| 6,732,438 B1 | 5/2004 | Enzinna |
| 6,741,048 B1 | 5/2004 | Desbiolles et al. |
| 6,801,011 B1 | 10/2004 | Ide |
| 6,812,667 B1 | 11/2004 | Yasohara et al. |
| 6,826,499 B1 | 11/2004 | Colosky et al. |
| 6,828,752 B1 | 12/2004 | Nakatsugawa et al. |
| 6,828,919 B1 | 12/2004 | Gold |
| 6,900,607 B1 | 5/2005 | Kleinau et al. |
| 6,900,613 B1 | 5/2005 | Hirono |
| 6,911,794 B1 | 6/2005 | Maslov et al. |
| 6,914,399 B1 | 7/2005 | Kushion et al. |
| 2005/0127861 A1 | 6/2005 | McMillan et al. |
| 2005/0171777 A1 * | 8/2005 | Moore et al. ............... 704/265 |

OTHER PUBLICATIONS

"SimpleServo Technical Section," 19 pages, prior to filing date of present application.

http://en.wikipedia.org/wiki/Brushless_Motor, "Brushless DC Electric Motor," Wikipedia, the Free Encyclopedia, 2 pages, printed Aug. 4, 2005.

http://www.drbrushless.com/articles/advuni/, "Advanced Unipolar PWM Tecnique," 2 pages, printed Aug. 12, 2005.

http://www.drbrushless.com/articles/dcbctheory/, "DC Brushless Communication Theory Basics," 1 page. printed Aug. 12, 2005.

http://www.drbruschless.com/articles/smartini/, "Smart Position Initialization Procedure for Sinusoidal Brushless Motor with Incremental Encoder with Hall Sensors in the Presence of Load Torque," 3 pages, printed Aug. 12, 2005.

* cited by examiner

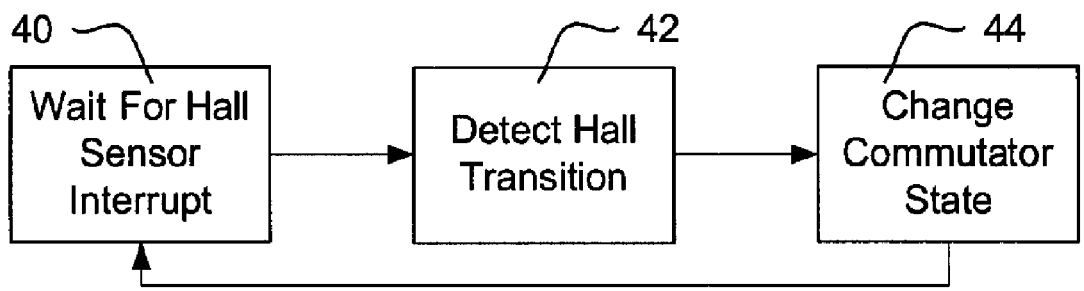
*PRIOR ART*
*FIG. 2*
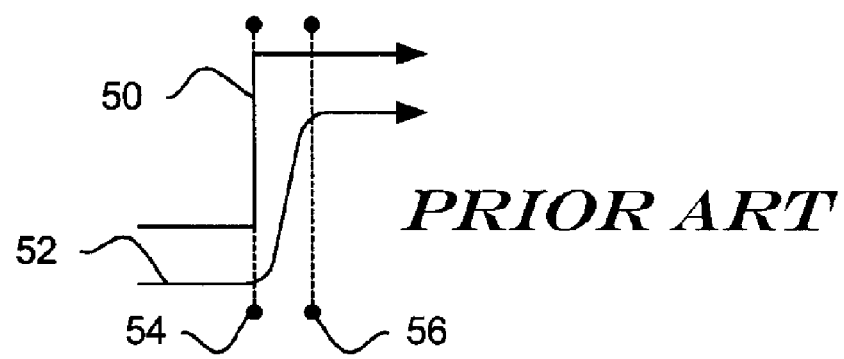
*PRIOR ART*
*FIG. 3*
*PRIOR ART*
*FIG. 4*

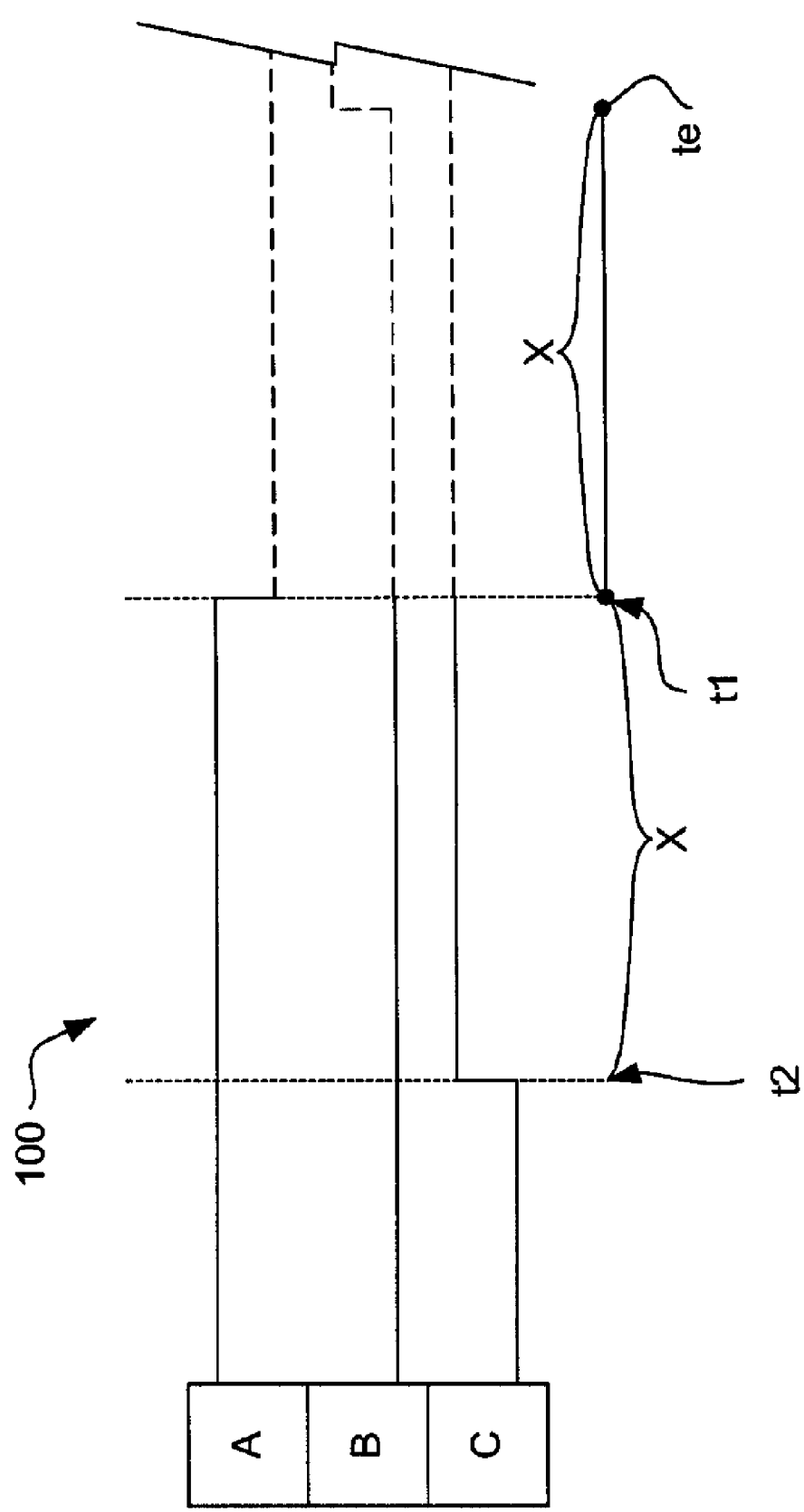

US 7,106,020 B1

METHOD OF OPERATING A BRUSHLESS DC MOTOR

FIELD

The present invention is related to the field of electric motors. More particularly, the present invention is related to brushless DC motors.

BACKGROUND

In a brushed DC motor, the brushes make mechanical contact with a set of electrical contacts provided on a commutator secured to an armature, forming an electrical circuit between the DC electrical source and coil windings on the armature. As the armature rotates on an axis, the stationary brushes come into contact with different sections of the rotating commutator. The commutator and brush system form a set of electrical switches that operate in sequence such that electrical power flows through the armature coil that is closest to the stator, which houses stationary magnets creating forces relative to the coil windings that cause rotation.

A brushless DC motor makes use of control circuitry to operate switches that replace the combination of brushes and electrical contacts on the commutator. While the control circuitry can add to the expense of the brushless DC motor, the elimination of the brushes and commutator reduces maintenance, as there is no wear on an associated brush, and prevents arcing in the motor that can occur as the commutator moves past the brushes. In some examples, a plurality of Hall effect sensors and magnets are disposed on the rotor and armature, with the outputs of the Hall effect sensors used to control current switching.

An example of a brushless DC motor appears in FIGS. 1A–1B. The motor 10, shown in cross section, includes an armature 12 and a rotor 14, with magnets 16, 17 disposed on the rotor 14. Hall effect sensing elements 18 are disposed on the armature 12 to sense the location of the magnets 16, 17. Control circuitry 20 includes Hall interrupt detection block 22 that is coupled to the Hall effect sensors 18 and generates an interrupt or other signal whenever one of the Hall effect sensors 18 transitions, indicating the rotation of the magnets 16, 17. When triggered, the detection block 22 interacts with commutator state circuitry 24 to control changing of the state of output switches 26. Using the output switches 26, the control circuitry 20 can couple energy from line power 28, which typically (though not necessarily) passes through a step-down transformer 30 to the motor 10.

FIG. 1B shows a different cross section of the motor 10, with magnets 16, 17 on the rotor 14, and three coil windings 32, 34, 36 on the armature 12. Usually, during operation, two of the coil windings 32, 34 will be activated while a third coil winding 36 will be grounded. FIG. 2 illustrates the timing of operation. In FIG. 2, a trio of armature coil windings are indicated as A, B, and C, with the state indicated by a "+" (driven by a voltage V), "−" (grounded) or "0" (open circuit). Alternatively, a dual power supply approach would have "+" be a signal of a first polarity, "−" be a signal of a second polarity, and "0" indicate that the winding is grounded. At each Hall effect sensor interrupt 38, the commutator state is changed, and the current flow through two of the coil windings changes. Operation is further illustrated in FIG. 3, which shows operation during a run state. As shown at 40, the control circuitry waits for a Hall effect sensor interrupt or trigger, detects a transition of the output for one of the Hall effect sensors, as shown at 42, and changes commutator state, as shown at 44. The control circuitry then returns to 40. Other tasks may also be performed, but the basic steps are shown. Refinement of this process to improve efficiency and output actuation is desirable.

SUMMARY

The present invention, in a first illustrative embodiment, includes a method of operating a brushless DC motor having a plurality of sensing elements for sensing rotor position with reference to an armature, the rotor position changing to cause sensing events, the DC motor operating by proceeding through a series of commutation states. The illustrative method may comprise extrapolating, using first and second most recent sensing events, a time for a third sensing event, and interpolating a plurality of time increments between the most recent sensing event and the time for the third sensing event. In some embodiments, the steps of extrapolating and interpolating provide data for a virtual encoder indicating rotor position. In some embodiments, the method further includes selecting a time offset, the time offset being a number of time increments. The time offset may be used for providing a phase advance in the brushless DC motor.

Another illustrative embodiment includes a brushless DC motor comprising an armature having electric coils disposed relative thereto, a rotor disposed relative the armature and adapted to rotate relative to the armature in response to a commutation sequence of electric signals delivered to the electric coils, a plurality of location sensors located relative the rotor and the armature for sensing when the rotor is at selected angular positions relative to the armature, and control circuitry adapted to capture signals from the plurality of location sensors and to selectively control the commutation sequence. The control circuitry may be adapted to determine a first time at which at least one location sensor indicates a change of rotor position and a second time at which at least one location sensor indicates a next change of rotor position, extrapolate a third time for a next change of rotor position, and interpolate a plurality of time increments between the third time and the second time. The control circuitry may use the extrapolated third time, and the plurality of time increments, to operate as a virtual encoder indicating rotor position. The control circuitry may be further adapted to select or define a time offset, the time offset comprising a number of the time increments. In some embodiments, the time offset may be used to provide a phase advance for use in the commutation sequence.

BRIEF DESCRIPTION OF THE FIGURES

FIG. 2 is a timing chart for a brushless DC motor;

FIG. 3 shows, in block form, a method of operating a brushless DC motor;

FIG. 4 is a signal graph showing current lagging voltage when applied to a motor winding;

FIG. 6A is a timing chart showing an illustrative method of extrapolation of a future position change in a DC brushless motor;

DETAILED DESCRIPTION

The following detailed description should be read with reference to the drawings. The drawings, which are not necessarily to scale, depict illustrative embodiments and are not intended to limit the scope of the invention.

Figure 1A:
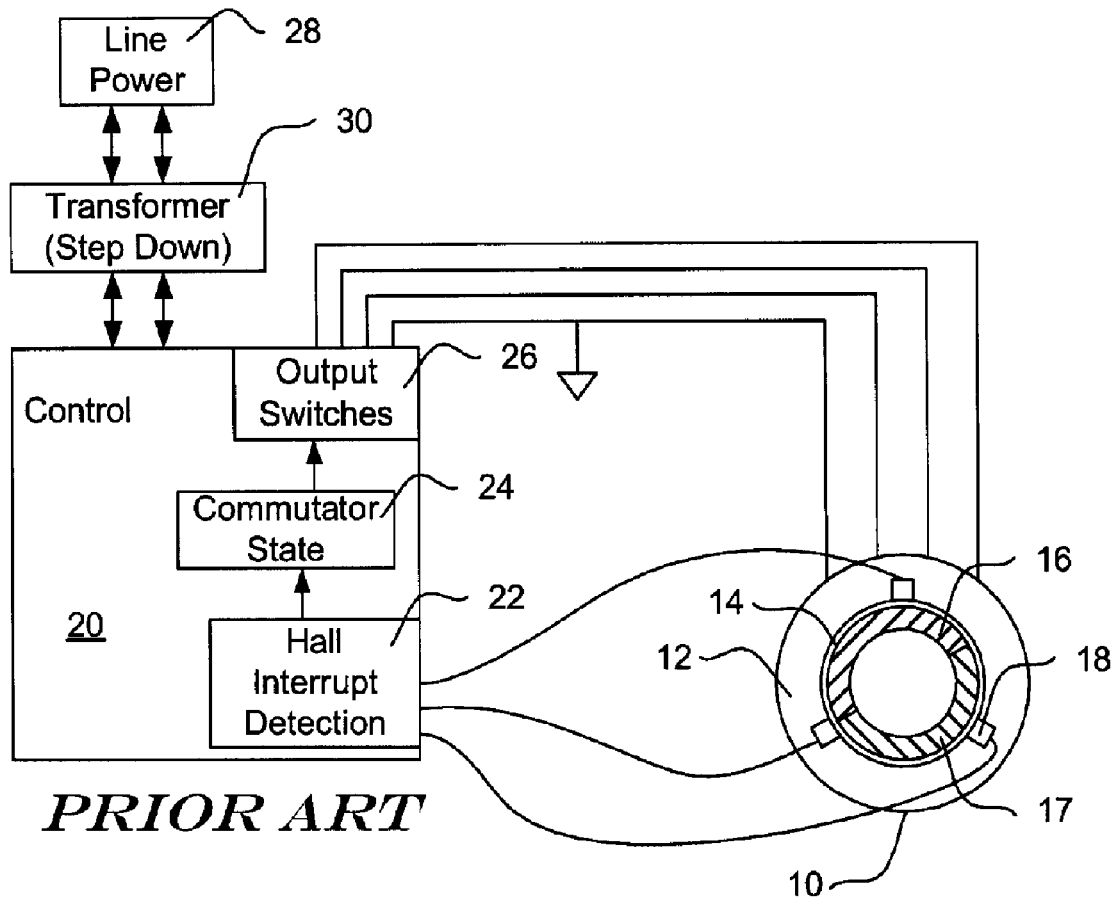
FIG. 1A illustrates various parts of a typical brushless DC motor.
Figure 1B:
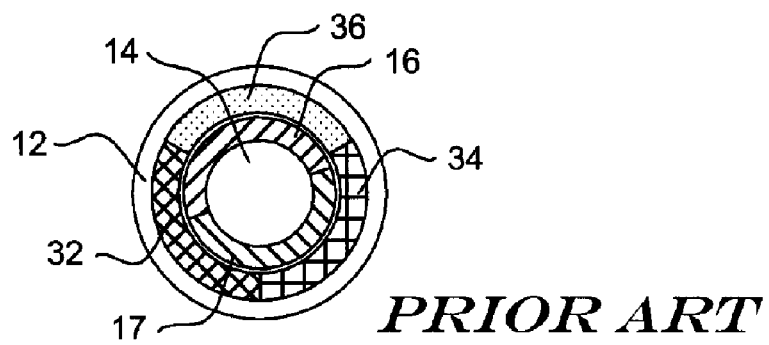
FIG. 1B shows, in cross section, a portion of a rotor/armature of a brushless DC motor including magnetic driving elements.

As explained above with reference to FIGS. 1–3, a typical brushless DC motor will make use of a plurality of windings disposed on an armature to generate magnetic force causing the rotor to rotate. As shown in FIG. 4, signal application to such windings is not ideal. Specifically, FIG. 4 is a signal graph showing current lagging voltage when applied to a motor winding. Because the winding is inductive, current 52 will lag the voltage signal 50, such that a voltage applied at a first time 54 will not cause a desired level of current flow until a later time 56. The time at which magnetic forces reach their maximum is delayed, and is not achieved at an ideal physical juxtaposition of the rotor and armature. Particularly, at higher speeds, efficiency is reduced, causing a reduction in output power.

One solution to this dilemma is to introduce a phase advance in the applied voltage. By applying the voltage at an earlier time, the current may be introduced such that magnetic forces between the armature coils and the rotor magnets coincide with physical positions of each that are closer to ideal. Various systems for applying a phase advance range from simple to quite complex.

In some more complicated (and, often, expensive) motors, an encoder is coupled to the shaft along with an optical element for reading the encoder. By use of the encoder, the rotor position can be calculated at all times. The use of the encoder then allows for application of sinusoidal driving signals instead of the simple block signals described with reference to FIGS. 2 and 4.

Figure 5:
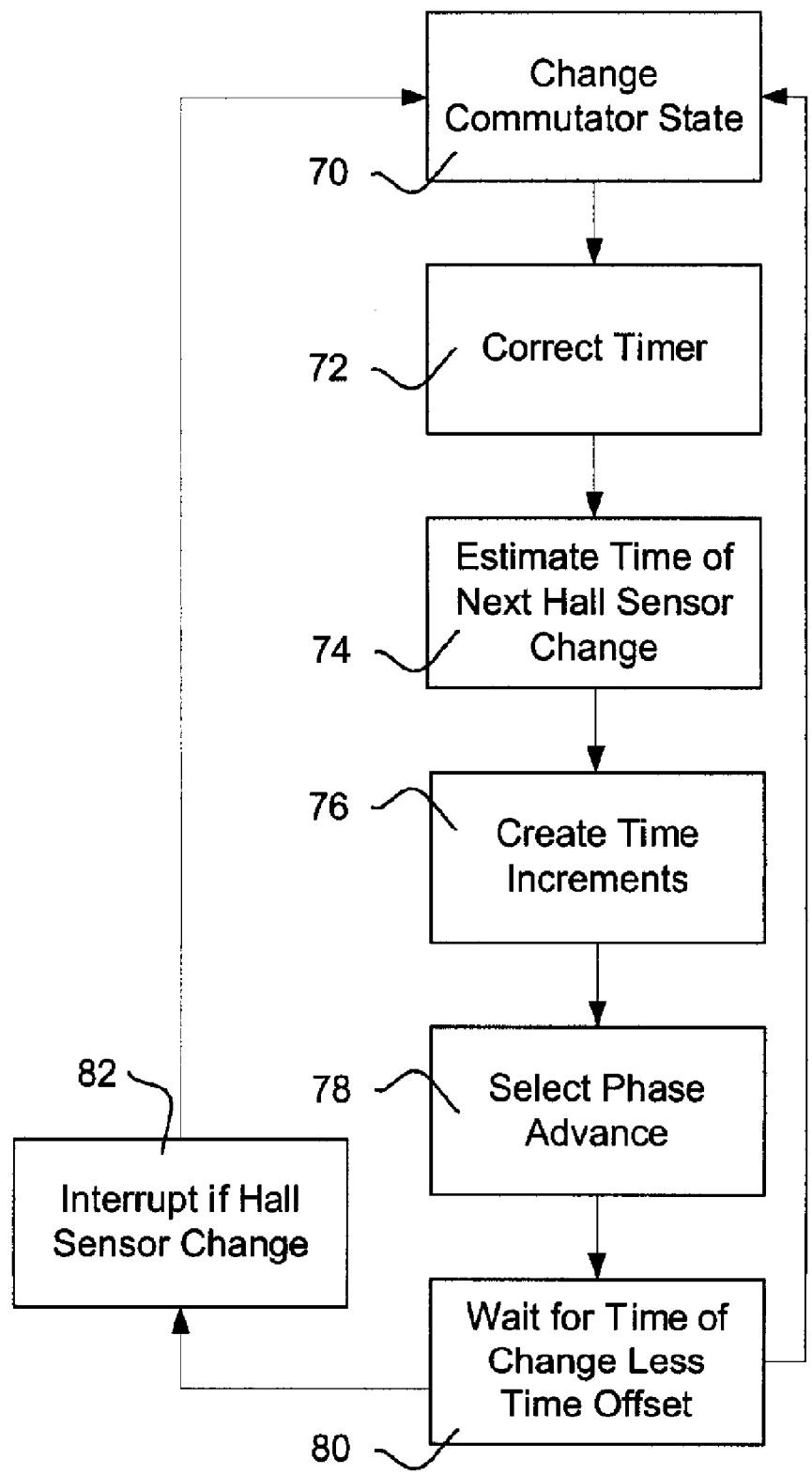
FIG. 5 is a block diagram for an illustrative method embodiment.

FIG. 5 is a block diagram for an illustrative method of the present invention. The illustrative method beings with a change in commutator state, as shown at 70. After the commutator state is changed at 70, a timer is reset, as shown at 72. A time for a next Hall effect sensor state change is then estimated. For example, given a first time that has elapsed between two (or more) most recent Hall effect sensor state changes, it may be estimated that a second time, sometimes equal to the first time, will elapse before a next Hall effect sensor state change.

Next, a plurality of time increments are created, as shown at 76. The time increments divide the time between a most recent Hall effect sensor state change and an estimated time for a next Hall effect sensor change. In some embodiments, the time increments may be equally sized, but this is not required. In an illustrative example, eight time increments are created. In other examples, four-to-forty-eight time increments may be defined, though other numbers of time increments may be defined depending upon various factors such as system timer capacity and desired resolution.

Next, as shown at 78, a phase advance is selected. In an illustrative embodiment, the phase advance is selected as an integer number of time increments, but this is not required. The phase advance may vary in amplitude depending upon the speed of the motor, and may vary in sign depending upon the direction the motor is spinning. For example, the following are illustrative for a system in which eight time increments are defined:

For Angular Velocity (AV)<–1500 rpm, phase advance=–8

For –1500<=AV<–900 rpm, phase advance=–6
For –900<=AV<–600 rpm, phase advance=–5
For –600<=AV<–300 rpm, phase advance=–4
For –300<=AV<–150 rpm, phase advance=–2
For –150<=AV<150 rpm, phase advance=0
For 150<=AV<300 rpm, phase advance=2
For 300<=AV<600 rpm, phase advance=4
For 600<=AV<900 rpm, phase advance=5
For 900<=AV<1500 rpm, phase advance=6
For 1500<=AV, phase advance=8

The scales may vary depending on particular device size, structure and performance. After the phase advance is selected, the method waits for the estimated time of change less a time offset calculated from the phase advance, as noted at 80. When the time of change less the time offset is reached, the method recycles by changing commutator state, as shown at 70. Alternatively, the method may include providing an interrupt if there is a Hall effect sensor change, as shown at 82. This may occur, for example, if the motor is accelerating due to an increase in applied voltage.

FIG. 6A is a timing chart showing an illustrative method of extrapolation of a future position change in a DC brushless motor. Outputs are shown for Hall effect sensors A, B, C, with the chart taking into account a current time, t1, and showing a past time, t2. Times t1 and t2 are defined because Hall effect sensors A and C, respectively, changed outputs at those times. An estimated time for a next Hall effect sensor transition, te, is also shown. The predicted or estimated time te is shown occurring after a duration of time, X, that is, in the illustrative example, equal to the duration of time between t1 and t2. If the motor is accelerating or decelerating, this may be accounted for by adjusting the duration of time, X, by decreasing X (if accelerating) or increasing X (if decelerating).

Figure 6B:
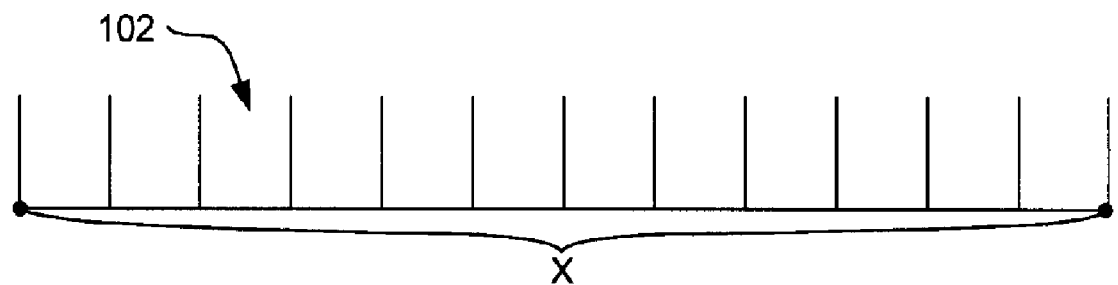
FIG. 6B is a timing chart showing interpolation of time increments after extrapolation of a future position change in an illustrative method.

FIG. 6B is a timing chart showing interpolation of time increments after extrapolation of a future position change in an illustrative method. As can be seen, the duration of time, X, from FIG. 6A has been divided into a number of time increments 102. The time increments 102 may be of equal duration, but this is not required. While twelve time increments 102 are shown in FIG. 6B, any other suitable number of time increments may be defined.

Figure 6C:
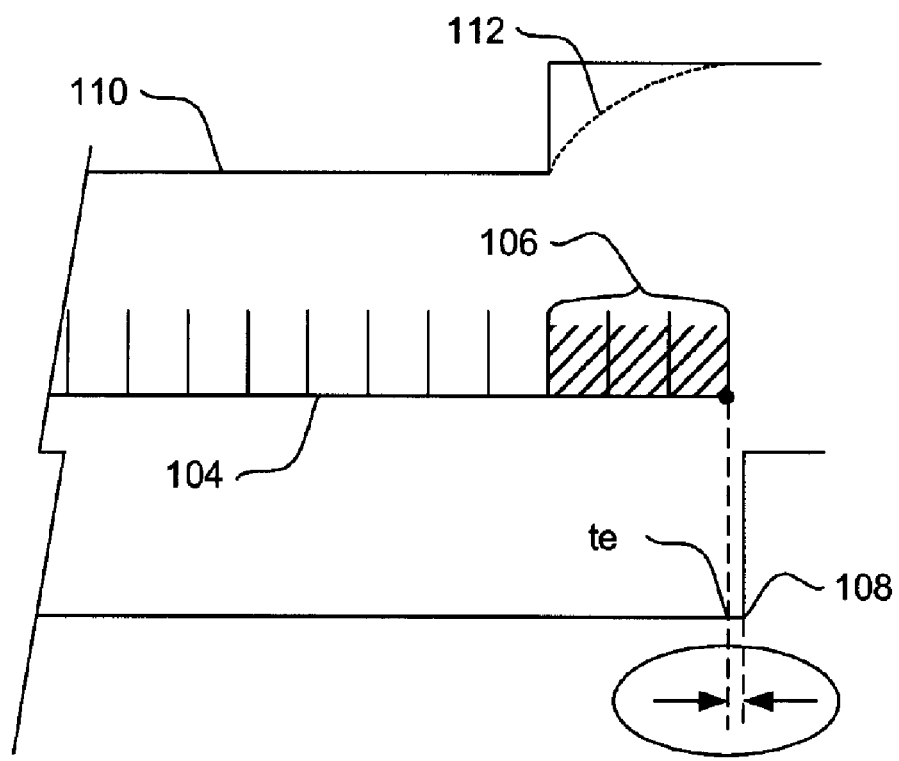
FIG. 6C is a timing chart showing the effects of phase advance and correction of extrapolation in an illustrative method.

FIG. 6C is a timing chart showing the effects of phase advance and correction of extrapolation in an illustrative method. A number of time increments are shown at 104, leading up to the estimated time, te, of the next Hall effect sensor transition. A number of time increments 106 have been selected as a time offset to provide phase advance. It can be seen from voltage signal 110 that the voltage applied to one or more of the coils used in the associated electric motor is changed at a time preceeding te by the selected time increments 106. The result is shown by line 112, which, schematically, represents the current flow that lags the voltage 110. Because of the phase advance, the current 112 reaches its maximum level at approximately te.

While te was the estimated time of a next Hall effect sensor transition, the actual time of such a transition can be seen at 108. The use of an estimated time of transition may introduce some error. However, as indicated above in the illustrative method of FIG. 5, the error may be reset to zero after each step in the commutation sequence by starting over with a new estimated time of a next Hall effect sensor transition based on previous sensed transitions.

The use of the extrapolation and interpolation operates to allow a virtual encoder. Specifically, the rotor position can be "known" or estimated at many positions, rather than just the six commutation cycle positions. This additional data may then be used to provide a sinusoidal driving signal without requiring the expense and mechanical difficulty of adding an encoder and optical or other encoder readers.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method of operating a brushless DC motor having a plurality of sensing elements for sensing rotor position with reference to an armature, the rotor position changing to cause sensing events, the DC motor operating by proceeding through a series of commutation states, the method comprising:
   extrapolating, using first and second most recent sensing events, a time for a third sensing event; and
   interpolating a plurality of time increments between the most recent sensing event and the time for the third sensing event.

2. The method of claim 1 wherein a sensing event occurs when a first magnetic element disposed on the rotor passes from a first position in which it is adjacent a first coil disposed on the armature to a second position in which the first magnetic element and the first coil are no longer disposed adjacent one another.

3. The method of claim 1 further comprising selecting a time offset by selecting a number of time increments.

4. The method of claim 3 further comprising using the time offset to perform a phase advance while advancing through the sequence of commutation states.

5. The method of claim 3 wherein the step of selecting a time offset is performed such that, at greater motor speeds, a greater time offset is selected.

6. The method of claim 1 further comprising using the interpolated time increments to operate as a virtual encoder, and applying a sinusoidal drive signal to the brushless DC motor.

7. A method of estimating a position of a rotating element of a brushless DC motor having an armature and a rotor, the method comprising:
   providing a plurality of sensors for sensing the position of the rotor, the sensors sensing relative motion between the sensors and one or more sensed elements, wherein one of the plurality of sensors or the one or more sensed elements is disposed relative the rotor and the other is disposed relative the armature;
   observing a first time at which the rotor is in a position relative the armature as indicated by a changing output of at least one of the plurality of sensors;
   observing a second time, after the first time, at which the rotor is in a position relative the armature as indicated by a changing output of at least one of the plurality of sensors;
   extrapolating, from the positions of the rotor at the first time and the second time, a likely position for the rotor at a third time; and
   defining, between the third time and the second time, a plurality of time increments, wherein rotor position is estimated between the second time and the third time by reference to the plurality of time increments.

8. The method of claim 7 wherein the motor operates using a commutation sequence, and the third time is calculated such that the likely position of the rotor is a position in which a change occurs relative to the commutation sequence.

9. The method of claim 7 further comprising performing a step in the commutation sequence at the third time.

10. The method of claim 7 further comprising selecting a time offset, the time offset being a number of time increments.

11. The method of claim 10 further comprising performing a step in the commutation sequence using the time offset to provide a phase advance function.

12. The method of claim 10 wherein the time offset includes a greater number of time increments when the rotor has a greater angular velocity than when the rotor has a lesser angular velocity.

13. The method of claim 7 further comprising providing a sinusoidal drive voltage by using the plurality of time increments to estimate rotor position as a virtual encoder.

14. A brushless DC motor comprising:
   an armature having electric coils disposed relative thereto;
   a rotor disposed relative the armature and adapted to rotate relative to the armature in response to a commutation sequence of electric signals delivered to the electric coils;
   a plurality of location sensors located relative the rotor and the armature for sensing when the rotor is at selected angular positions relative to the armature; and
   control circuitry adapted to capture signals from the plurality of location sensors and selectively control the commutation sequence;
   wherein the control circuitry is adapted to:
   determine a first time at which at least one location sensor indicates a change of rotor position and a second time at which at least one location sensor indicates a next change of rotor position;
   extrapolate a third time for a next change of rotor position; and
   interpolate a plurality of time increments between the third time and the second time.

15. The motor of claim 14 wherein the control circuitry is also adapted to select a time offset comprising a number of the time increments.

16. The motor of claim 15 wherein the time offset comprises a greater number of the time increments when the rotor is moving at a greater angular velocity than when the rotor is moving at a lesser angular velocity.

17. The motor of claim 16 wherein the control circuitry performs steps to advance the commutation sequence at a time separated from the third time by the timer offset.

18. The motor of claim 16 wherein the control circuitry performs steps to use the timer offset to perform a phase advance function.

19. The motor of claim 15 wherein the control circuitry performs steps to advance the commutation sequence at a time separated from the third time by the timer offset.

20. The motor of claim 14 wherein the control circuitry is adapted to use the defined time increments to perform virtual encoding of rotor position and provide a sinusoidal driving signal.

* * * * *